United States Patent [19]

Hirs

[11] 4,230,572
[45] Oct. 28, 1980

[54] FILTER METHOD AND APPARATUS

[76] Inventor: Gene Hirs, 6865 Meadow Lake Dr., Birmingham, Mich. 48010

[21] Appl. No.: 739,755

[22] Filed: Nov. 8, 1976

[51] Int. Cl.² ............................................. B01D 37/00
[52] U.S. Cl. ..................................... 210/767; 210/230
[58] Field of Search ............... 210/224, 227, 228, 230, 210/400, 79, 65; 100/219, 204

[56] References Cited

U.S. PATENT DOCUMENTS

| 26,622 | 12/1859 | Rymes | 100/204 X |
|---|---|---|---|
| 942,173 | 12/1909 | Heller | 100/219 |
| 1,904,531 | 4/1933 | Raymond | 210/224 |
| 2,185,314 | 1/1940 | Raymond | 210/224 X |
| 3,094,743 | 6/1963 | Axtell | 100/219 X |
| 3,132,378 | 5/1964 | Johannigman | 100/219 X |
| 3,342,123 | 9/1967 | Ermakov et al. | 210/400 |
| 3,497,063 | 2/1970 | Hirs | 210/79 |
| 3,862,596 | 1/1975 | Ladislao | 100/219 |
| 3,899,426 | 8/1975 | Hirs | 210/400 |

*Primary Examiner*—Theodore A. Granger
*Attorney, Agent, or Firm*—Hiram P. Settle

[57] ABSTRACT

A method and apparatus are disclosed for mechanically locking a movable filter shell of a pressure filter in filtration position adjacent a second fixed filter shell, in order to accommodate and resist higher internal filtering pressures. In the method, a gasket between the two filter shells is compressed to an extent greater than necessary to achieve a liquid tight seal, in response to movement of the movable shell toward the fixed shell. Next, a locking member is freely inserted between the movable shell and an abutment with clearance being provided in order to facilitate the insertion of the locking member due to the movable shell excessively compressing the gasket. Upon initiation of the filtration cycle, the movable shell is slightly displaced away from the fixed shell in response to internal filtration pressures, with the locking member preventing further displacement in order to maintain the gasket in water-tight sealing compression. Upon termination of the filtration cycle, the movable shell is slightly displaced toward the fixed shell, to provide clearance for free withdrawal of the locking member.

22 Claims, 8 Drawing Figures

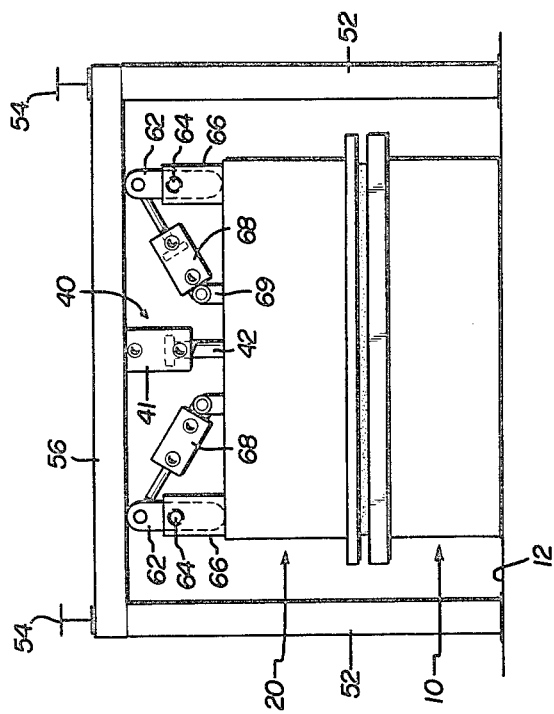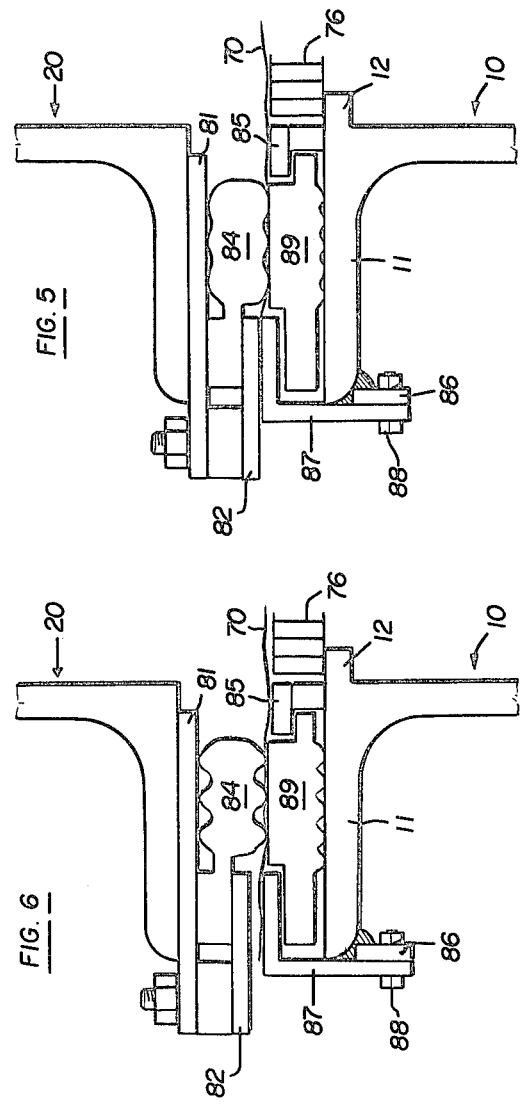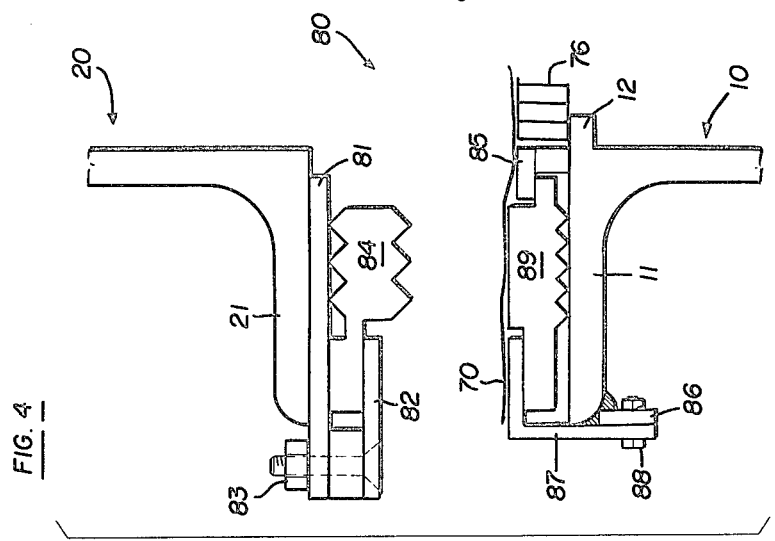

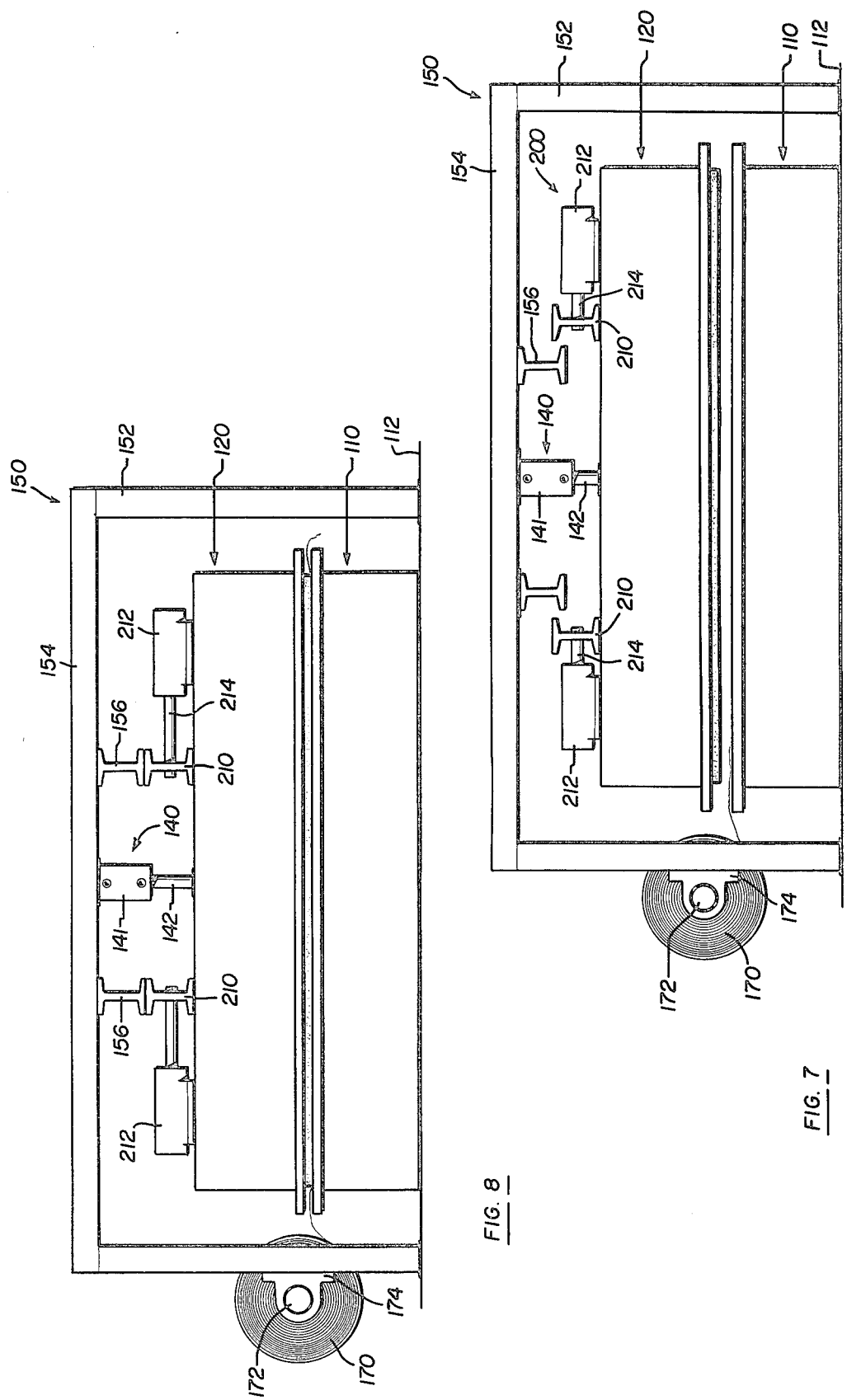

FILTER METHOD AND APPARATUS

BACKGROUND OF THE INVENTION

1. Field of the Invention

This disclosure relates generally to an automated liquid filter apparatus and method, and more particularly to a filter method and apparatus including a clamping and locking mechanism to maintain the shells of the filter in a liquid-tight closed position during a filtration cycle.

2. The Prior Art

Pressure filters of the plate and frame type have been used for many years in many different applications. Generally speaking, this type of filter may be described as a frame on which there are a number of indented loose plates with filtering surfaces, the plates being clamped together to form a series of hollow chambers and being capable of withstanding high internal pressures. The filtering surfaces are usually ribbed or grooved and covered with cloths of filtering material.

The regular plate and frame filter press consists of a filter press frame made of two end supports rigidly held together by horizontal steel bars. Upon these horizontal bars are placed a varying number of flush plates and frames clamped together, thereby forming a hollow chamber. There could be many of these plates stacked against each other and mating at the edges which are machined to form a joint surface.

This type of a filter is usually closed by a screw or hydraulic ram for pressing the plates and filter press frames together. Most of these types of plate and frame filters are normally opened and closed by hand but, in some larger size units, automatic devices are often used. The filter itself, however, in its entirety cannot be considered an automated piece of equipment because constant manual attention is required to perform various functions.

The filter press has found wider application than any other type of filter. It is structurally simple without complicated auxiliaries making for low initial cost and low installation cost. Additionally, it can be operated by unskilled labor and considerable pressures can be applied to large filter areas in a compact space. The greatest disadvantage of the filter press is its intermittent operation and the labor involved therein. Since the size of the plate and frames are generally within some reasonable size, such as 10 to 20 square feet per unit, and the thickness of the cake formation is generally up to about 2 inches, it is quite evident that if a heavy slurry were pumped to this type of a filter frequent cycling would occur. Since there are many chambers that the cake is in and since these chambers all have to be separated, the time consumed to do this is laborious and expensive. Therefore, this type of a filter is restricted on the total solids that it can handle in a given period of time. Many times it is required that the solids be discharged from the filter as a dry cake. With this type of a filter, then, it is necessary to drain the frames completely before they can be opened. If this is not done, the cake will discharge as a wet slurry. There are also many conditions where the cake is somewhat compressible or where weak structured solids are present, such that filling the frame becomes very difficult. Therefore, it becomes apparent that even though this type of filter has universal application, it also has some severe restrictions.

In order to overcome these difficulties inherent in the basic plate and frame filter, a simplified single plate type of filter was shown in U.S. Pat. Nos. 2,867,324, 2,867,325 and 2,867,326. These patents, all by the applicant, describe a simplified single plate filter that is completely automated. These filters proved to be of great value in the filtration art in that they could be placed in areas where no manual attention was required and the filters could go through the process of filtration and dry sludge removal without any manual attention.

These filters were primarily used on applications where a large volume of liquid was being pumped to the filter at a relatively moderate suspended solids concentration. Usually the total solids of the influent to the filter were less than 0.1%. However, with the large flow rates, in the neighborhood of 30 to 50 GPM/ft.$^2$, it is apparent that these filters could filter and discharge a considerable amount of solids.

One inherent characteristic of this type of filter was its limitation on operating pressures. The filter, being substantially a box that is divided in half, had to have a greater external force to keep the box closed than the internal forces that were generated by the hydraulic pressures. For instance, with 10 psi internal pressure, each square foot of the filter had to have an external counter force of at least 1,440 pounds to maintain the forces in equilibrium. Therefore, a filter with 10 square feet of filter area had to have external cylinders or external forces greater than 15,000 pounds to overcome an internal force of 10 psi. Since most of these filters were used on fairly porous suspended solids that were generated from machining operations, the pressure range in which this equipment operated was quite satisfactory.

It was found that this type of filter was extremely good for dewatering various types of sludges. Most of the dewatering jobs had higher concentrations and finer suspended solids than were ever applied to this kind of filter. A typical slurry could very well be in a 5 to 10% concentration with most of the suspended solids being finer than 300 mesh. The flow rate through these filters was reduced to a considerable extent because of the nature of the suspended solids that were being filtered. Many types of slurries actually could not be filtered effectively with this type of filter because, in order to get acceptable flow rates, higher pressures were required than could be applied to this particular type of filter. Generally, the limitation on this simplified plate and frame filter was about 10 to 12 pounds internal hydraulic pressure. Since, on certain applications greater pressure was required, the applicant developed the invention embodied in U.S. Pat. No. 3,333,693 directed to a modified, single plate, pressure filter that had the main body of the filter fixed and a seal that was the only closure and movable part of the filter. In this type of apparatus, larger filter areas could be utilized and operating pressures could be increased to approximately 20 psi. This movable seal filter, although a substantial improvement over the movable shell filter, still was not capable of high enough filtration pressures to tackle most of the different dewatering jobs.

A typical dewatering job could be defined as the filtration of coal tailings in a coal mining and processing operation where the suspended solids could be from 1 to 40% with the solids being finer than 300 mesh. These types of operations usually have some extreme fines present that also tend to lock up and close the porosity of the filter cake and reduce the flow rate considerably. On these types of sludges and many other similar ones, higher pressures in the neighborhood of 50 to 100 psi can improve flow rate and filter through-put considerably. Since the quantities of sludge also are many tons per hour, it becomes imperative that this type of a filter be capable of filtering and discharging these large quantities automatically and with the maximum through-put both in liquid and in solids.

Thus, the prior art has not provided a practical filtration method or structure to accommodate relatively high hydraulic pressures during a filtration cycle.

SUMMARY OF THE INVENTION

These prior art problems and disadvantages are overcome by the present invention, which embodies the concept of mechanically locking together two filter shells so that internal pressures of up to at least the range of about 100 psi to 250 psi can be easily accommodated and so that the filter can discharge the sludge that it has accreted on the filter belt automatically in a fast, efficient manner.

This is accomplished in one aspect of the invention by a pressure filter which includes a filter medium interposed between aligned shell members defining an inlet chamber for receiving contaminated liquid under pressure and a discharge chamber receiving clarified liquid flowing through the filter medium. The shells include opposed peripheral sealing surfaces, with at least one of the sealing surfaces being defined by a compressible gasket. One of the shells is movable and is displaced by an appropriate power means, such as a pneumatic cylinder and piston arrangement. Mechanical means are included for locking the displaceable shell in a filtration position adjacent the other shell after the displacement means has displaced the movable shell toward the other shell and caused the gasket to be compressed to establish an essentially water-tight seal around the periphery of the two shells. The mechanical locking means includes a pair of spaced abutment surfaces, wherein one of the surfaces is placed in engagement with the movable shell during the filtration cycle and the other of the surfaces is simultaneously placed in engagement with a spaced, fixed locking surface, thereby resisting the internal filtration pressure which exerts an opening force on the movable shell.

In one of the preferred embodiments, the mechanical locking means includes a pivotally mounted, elongated locking strut which is mounted on the movable shell. A fluid pressure piston and cylinder arrangement is also mounted on the movable shell for pivoting the locking strut into position between the movable shell and the spaced locking surface, which in this embodiment is positioned in a direction away from the other shell.

In a second preferred embodiment, the mechanical locking means includes a blocking beam carried by the movable shell. A fluid pressure piston and cylinder arrangement displaces the beam in a direction essentially perpendicular to the direction of movement of the movable shell for selective alignment with the spaced locking surface, which in this embodiment is likewise positioned in a direction away from the other shell.

In the method, a first movable shell is moved from a first position spaced from a second, fixed shell to a second position adjacent the other shell for filtration. During the final phases of this displacement, a gasket which is interposed between opposed, aligned peripheral sealing surfaces on each of the shells is compressed to establish an essentially water-tight seal between the filter shells. Next, a force bearing member is positioned in alignment with the movable shell and an abutment surface to lock the movable shell in the filtration position. The filtration process itself is initiated by introducing contaminated liquid under pressure into an influent chamber defined by one of the shells, then flowing the liquid through the filter medium to accumulate contaminants, and then receiving clarified liquid from the filter medium in an effluent chamber defined by the other of the shells. During the initial phases of flowing liquid into the filter assembly, the movable shell is slightly displaced away from the other shell in response to the internal pressure of the contaminated liquid. The displacement of the movable shell during this phase of the operation is limited by the force bearing member to maintain the movable shell in a filtration position adjacent the other shell and to maintain the gasket in compression for an essentially water-tight seal between the separable shells.

After the filter medium has accumulated a significant quantity of contaminants, liquid flow through the filter shells is terminated, thereby relieving the internal pressures in the filter shell assembly. Upon the pressure relief, the movable shell is slightly displaced toward the other shell against the resistive force of the compressible gasket, to provide clearance to accommodate displacement of the force bearing member to a second position to unlock the movable shell. Finally, the movable shell is displaced away from the other shell to accommodate the discharge of the accumulated contaminants.

In the most preferred method, the movable shell is displaced by a pneumatic piston and cylinder arrangement and pressure is applied to the movable shell by this cylinder throughout the filtration cycle.

In one preferred method aspect, the force bearing member is comprised of a pivotally mounted locking strut carried by the movable shell, and the step of positioning the force bearing member in the locking position is characterized by pivoting the strut into a position essentially parallel to the direction of movement of the movable shell.

In another preferred method embodiment, the force bearing member is comprised of a slidable beam carried by the movable shell, and the step of positioning the force bearing member in the locking position is characterized by moving the beam in a direction essentially perpendicular to the direction of movement of the movable shell.

Accordingly, the present invention provides several advantages not provided by the prior art. For example, the present invention accommodates higher filtration pressures, thereby enabling the utilization of flat-bed type filtration equipment in many more specialized applications. Additionally, the present invention provides the ability to make filters much larger than was heretofore permissible, thereby enabling the accommodation of drastically increased influent quantities. Further, large expensive, maintenance-requiring clamping equipment, such as large hydraulic presses, are eliminated. Another advantage is related to the excessive compression of the gasket, which provides clearance for free insertion of the locking devices into position for maintaining the movable filter shell in position during the filtration cycle.

These and other advantages and meritorous features of the invention will be more fully appreciated from the following detailed description and the appended claims.

BRIEF DESCRIPTION OF THE DRAWINGS

FIG. 3 is an elevational view similar to FIG. 2, and illustrating the locking mechanism of this embodiment in position to lock the two shells of the filter in filtration position.

FIGS. 4–6 are enlarged, fragmentized illustrations depicting the closing and locking operation of the filter shells.

FIG. 7 is a side elevational view similar to FIG. 1, but illustrating a second embodiment of the invention.

FIG. 8 is a side elevational view similar to FIG. 7, and illustrating the locking mechanism in position to clamp the filter shells of this invention together.

DETAILED DESCRIPTION OF THE PREFERRED EMBODIMENT

The present invention relates primarily to an improved mechanism for locking the separable shells of a filter assembly together in order to accommodate higher filtration pressures. A first embodiment of this invention is illustrated particularly in FIGS. 1–3; and a second embodiment of the invention is primarily illustrated in FIGS. 7 and 8. FIGS. 4–6 relate to both embodiments and illustrate the manner of compressing a gasket between the shells in order to provide clearance between locking abutment surfaces.

Figure 2:
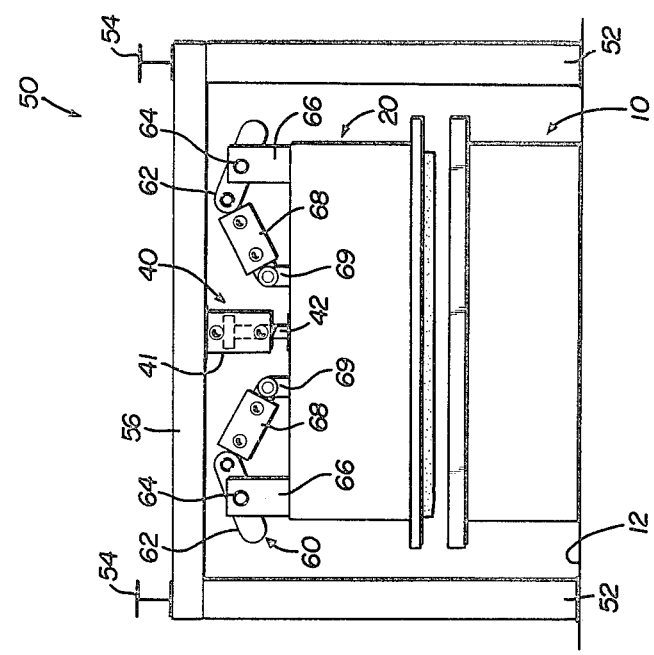
FIG. 2 is an elevational view taken along plane 2—2, as shown in FIG. 1.
Figure 1:
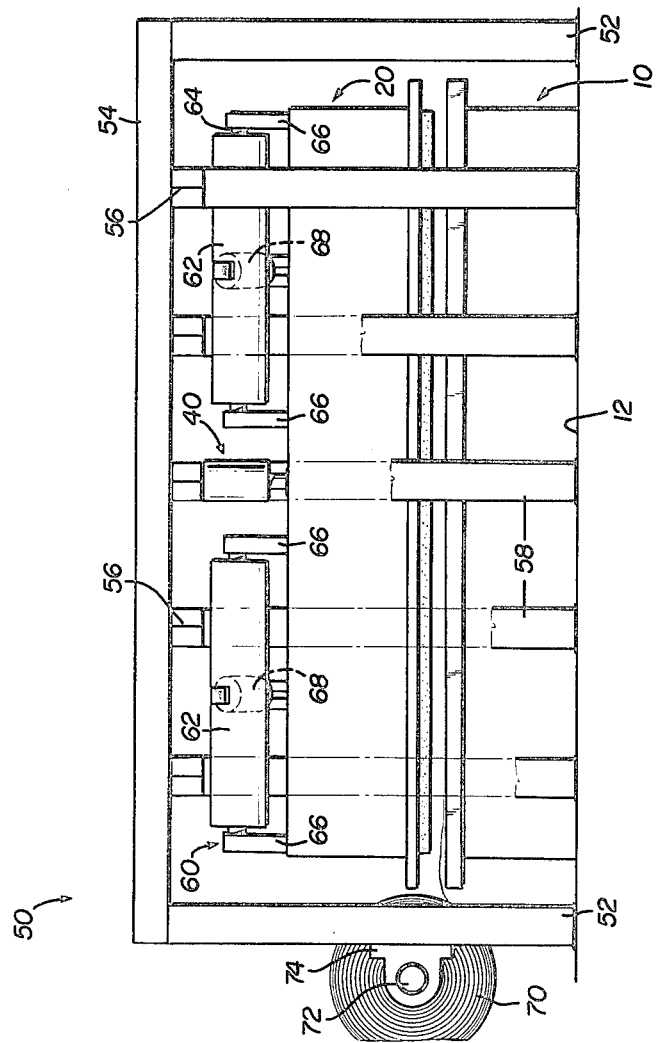
FIG. 1 is a side elevational view of a first embodiment of the present invention.

The Embodiment of FIGS. 1–3

Referring more particularly to the drawings, FIGS. 1–3 illustrate a fixed filter shell 10 as supported by a base member 12. A movable filter shell 20 is vertically aligned with the lower shell 10 and is vertically displaced by a piston and cylinder arrangement, including a piston 42 interconnected with the filter shell and a cylinder 41, which is mounted to a support structure. The general configuration and arrangement of the upper and lower shells is essentially the same as that shown in applicant's U.S. Pat. No. 3,497,063, incorporated by reference.

A load carrying structure 50 generally surrounds the upper and lower shells 10 and 20, with the various beam components of the structure being rigidly mounted together, for example by welding. More particularly, the structure includes four corner legs 52 and two primary horizontal cross beams 54 extending between respective pairs of corner legs 52. A plurality of secondary horizontal beams 56 are mounted to the underneath side of each of the primary horizontal beams 54 and provide fixed abutment surfaces for the locking structure, as will be more fully described below. Additionally, the structure 50 includes secondary vertical legs 58 which extend from the support 12 to the secondary horizontal beams 56 for rigidifying purposes.

A filter shell locking structure is represented generally by reference numeral 60 and includes elongated locking struts 62 which are pivotally mounted on shafts 64. Mounting brackets 66 are appropriately secured to the top of the movable shell 20 and rotationally support the shafts 64 so that the locking struts 62 may be pivoted about the axis of the shafts. Hydraulic piston and cylinder actuating means 68 are interconnected with the locking struts 62 to effect the pivoting movement, with the cylinders 68 being mounted to the top of the movable filter shell 20 by mounting brackets 69.

As shown in FIG. 1, a roll of disposable filter medium is supported on a shaft 72 which is mounted on a pair of the corner legs 52 by a pair of brackets 74. This arrangement permits the filter medium 70 to be periodically indexed into the filter assembly between the filter shells 10 and 20 in a conventional manner to replace medium which has accumulated contaminants. Alternatively, a reusable filter medium may be used, in which case the medium is mounted on a chain conveyor system mounted externally of the two filter shells. In either of these two embodiments, the medium will be supported by a grate 76 (shown in FIGS. 4–6) which is mounted on a flange 12 on the fixed shell 10.

A sealing gasket assembly 80 is provided around the aligned peripheries of the filter shells, as shown in FIGS. 4–6. This assembly is essentially conventional, and includes a fixed upper retainer plate 81 mounted on flange 21 of the upper shell 20. A removable upper retainer plate 82 is secured to plate 81 by a bolt 83, thereby securing an upper gasket 84 to the periphery of the upper shell 20.

On the lower shell 10, the sealing gasket assembly includes a fixed L-shaped retainer bracket 85 secured to the shell 10, a vertical retainer plate 86 secured to a flange 11 on the shell 10, and an L-shaped bracket member 87 removably secured to plate 86 by a bolt 88. As shown, a lower gasket 89 is retained in position between bracket members 85 and 87 around the entire periphery of the lower fixed shell 10.

Both gaskets 84 and 89 may be comprised of a suitable resilient, compressible gasket material for the purposes of this invention, namely to establish a water-tight seal around the periphery of the shells and to accommodate displacement of the upper shell 20 relative to the lower shell 10 to provide a clearance for the locking struts 62, as will be more fully explained below.

In operation, the upper shell 20 will be raised to the position shown in FIGS. 1, 2, and 4 in order to accommodate the discharge of contaminants which have been accumulated upon filter medium 70. After properly positioning the filter medium for a filtration cycle, cylinder arrangement 40 is actuated by pumping fluid under pressure into cylinder 41 to extend piston rod 42. The downward extension of piston rod 42 displaces movable filter shell 20 downwardly toward the fixed filter shell 10 so that the gaskets 84 and 89 are compressed to establish a water-tight seal around the periphery of the filter assembly. In accordance with the present invention, the gaskets 84 and 89 are compressed to a condition as shown in FIG. 5, this compression being greater than that necessary to establish a water-tight seal. This excessive compression establishes a clearance so that the locking struts 62 may be freely pivoted into the position shown in FIG. 3 to serve as a force bearing member in abutment with both the upper shell 20 and the horizontal cross beams 56. For example, the gaskets 84 and 89 may be collectively compressed by approximately ⅜ of an inch in FIG. 5, during which time the locking struts are pivoted into the position shown in FIG. 3. Thus, locking struts 62 should be dimensioned to have a length slightly less than the distance between the top of movable shell 20 and the bottom of cross beams 56 when the gaskets are compressed to the extent of FIG. 5.

Next, the movable upper shell 20 is slightly displaced upwardly to place the locking struts 62 in abutment with both the cross beams 56 and the upper shell 20. This displacement may be on the order of about 3/16 of an inch and may be accomplished primarily in one of two ways. First, pressure may be continuously applied by piston rod 42 to the shell 20 during a filtration cycle. In this event, upper shell 20 will remain in the position shown in FIG. 5 until contaminated liquid flows under pressure into a receiver or influent chamber defined by the shell 20. In response to the internal hydraulic pressure created by the contaminated liquid, the shell 20 is forced upwardly slightly to the position shown in FIG. 6, with the gaskets 84 and 89 still being sufficiently compressed to maintain an essentially water-tight seal around the periphery of the filter assembly. Alternatively, pressure from cylinder 41 may be relieved after locking strut 62 is pivoted into position, resulting in a slight displacement of the movable shell 20 away from the fixed shell 10 in response to the resilient forces from the compressed gaskets 84 and 89. In this second alternative mode of operation, the upper shell 20 will also be slightly displaced upwardly upon the initiation of the filtration cycle by flowing contaminated liquid under pressure into shell 20, thereby placing the locking struts in compression to lock the movable shell in filtration position. Again, even though the compression of the seals is slightly relaxed, a water-tight seal is maintained.

Accordingly, it will be appreciated that the relative dimensions may be expressed as follows: The distance between the upper surface of shell 20 and the lower abutment surface of beams 56 may be represented as a dimension "d" when shell 20 is in the position of FIG. 5. The elongated length of strut 62 may be represented as a dimension "d−x", where x is approximately equal to about 3/16 of an inch. Likewise, the distance between the top surface of upper shell 20 and the lower abutment surface of beams 56 in the position of FIG. 6 may also be represented by the dimension "d−x".

As will be appreciated, the contaminated liquid under pressure flows from the receiver chamber of the movable shell 20, through the filter medium 70, through the grate 76 and into an effluent or discharge chamber defined by the lower, fixed shell 10. After a period of time, the filter medium 70 becomes clogged by an accretion of contaminants, requiring a discharge of the contaminants for further filtration. At this point of the process, the flow of contaminated liquid into the influent chamber is discontinued, resulting in a return of the internal pressure of shell 20 to atmospheric. If pressure has been applied continuously by clinder 40, the upper, movable shell 20 will be displaced downwardly to the position shown in FIG. 5 in response to the termination of contaminated liquid flow, thereby providing the desired clearance for pivoting the locking struts from the position of FIG. 3 to that of FIG. 2. In the alternative event that pressure has not been continuously applied by piston 42 during the filtration cycle, the movable shell 20 will remain essentially in the position shown in FIG. 6 after the termination of contaminated liquid flow.

Thereafter, piston rod 42 may be extended slightly in response to the introduction of fluid under pressure into cylinder 41 thereby slightly displacing movable shell 20 downwardly to compress the gaskets to the condition as shown in FIG. 5 in order to provide clearance for freely pivoting the locking struts 62 to the position of FIG. 2. After the struts 26 are pivoted, piston rod 42 is retracted to raise shell 20 so that accumulated contaminants may be discharged.

The Embodiment of FIGS. 7 and 8

Referring now more particularly to FIGS. 7 and 8, a second embodiment of the invention is disclosed wherein components which are identical to the components shown in FIGS. 1–3 are represented by reference numerals greater by a factor of 100 than those shown in FIGS. 1–3. For example, this embodiment includes a fixed, bottom filter shell 110 supported upon a base 112. An upper shell 120 is vertically aligned with the bottom shell 110 and movable by a hydraulic cylinder 141 and piston 142. As will become apparent, the sealing gasket assembly and its mode of compression may be identical to that shown in FIGS. 4–6. Additionally, a pair of horizontal beam 156 are secured to beams 154 of the support structure, in order to provide abutment surfaces for the locking structure.

The only difference between this embodiment and that of FIGS. 1–3 resides in the particular locking structure, which is represented generally by reference numeral 200. More particularly, the locking structure includes a pair of horizontally displacable beam 210 carried on the top surface of the movable shell 120. These beams 210 are displacable by locking cylinders 212 and associated piston rods 214, the locking cylinders being secured to the top of the movable shell 120.

In operation, the upper filter shell 120 is raised by piston rod 142 to the position shown in FIG. 7 to accommodate the discharge of contaminants which have been accumulated on a filter medium between the filter shells. After the discharge of contaminants, piston 142 is displaced downwardly in response to fluid being pumped into cylinder 141, causing the upper shell 120 to be displaced downwardly to the position shown in FIGS. 8 and 5. In this position, the gasket members are excessively compressed to provide a clearance so that the locking beams 210 may be freely displaced from a position relative to the upper shell 120 which is shown in FIG. 7, to a position in alignment with the abutment beams 156. As in the prior embodiment, the vertical elongated dimension of the locking beams 210 should be slightly less than the distance between the bottom surfaces of beams 156 and the top surface of shell 120 when the shell 120 is displaced to the position of FIG. 5, thus providing clearance for the free insertion of the beams 210 into their locking positions.

After the beams 210 have been positioned as shown in FIG. 8, pressure may be either relieved or continuously applied by piston rod 142, as more fully explained previously in connection with the discussion relating to FIGS. 4–6. In short, the upper shell 120 is slightly displaced upwardly during the filtration cycle to the position as shown in FIG. 6, placing the beams 210 in compression to lock the shell 120 in a filtration position to maintain a liquid-tight seal around the filter shells. After the termination of filtration flow, shell 120 is displaced slightly toward the fixed shell 110 to the position of FIG. 5, in order to provide a clearance between the lower abutment suraces of beams 156 and the upper surface of filter shell 120 in order to facilitate the removal of the beams 210 from their position shown in FIG. 8 to their position shown in FIG. 7. Thereafter, piston rod 142 is retracted to raise filter shell 120 to the position of FIG. 7 to accommodate the removal of accumulated contaminants.

As in the embodiment of FIGS. 1–3, the vertical dimension of beams 210 may be represented by the dimension "d−x", where "d" is the dimension between the upper surface of shell 120 and the lower abutment surface of beams 156 in the position of FIG. 5.

It will be understood that the foregoing description is merely exemplary of the overall invention, which is limited only by the appended claims.

Having therefore fully and completely disclosing my invention, I now claim:

1. In a pressure filter assembly having a filter medium between relatively movable, aligned filter shells which respectively define receiver and discharge chambers in the assembly; the shells having opposed, aligned peripheral surfaces, with at least one of said shells carrying a compressible gasket on its peripheral surface for sealing the filter assembly during filtration; an influent passageway for supplying contaminant-carrying liquid under pressure to the receiver chamber; and an effluent passageway interconnected with the discharge chamber for receiving clarified liquid after its passage through the filter medium, upon which contaminants are accreted; the improvement of: displacement means for relatively displacing the filter shells (a) to place the shells in adjacent proximity for a filtration cycle, with the gasket compressed to seal the filter assembly (b) to compress the gasket prior to the initiation of a filtration cycle to an extent greater than that necessary to seal the filter assembly, and (c) to displace the shells from each other subsequent to a filtration cycle to accommodate the removal of the filtered solids; a fixed abutment surface spaced from one of said filter shells; and blocking means freely insertable between said one shell and the abutment surface when the displacement means has compressed the gasket to said greater extent, the dimension of said blocking means being slightly less than the corresponding dimension between said shell and the abutting surface when the gasket is compressed; said one shell being at least slightly displaced away from the discharge shell upon the introduction of liquid under pressure into the filter assembly for a filtration cycle, thereby (a) slightly reducing the compression on the gasket, (b) placing the blocking means in compression to resist the forces generated within the filter shells during filtration, which forces tend to separate the filter shells, and (c) maintaining the gasket in compression to maintain an essentially liquid-tight seal.

2. The filter as defined in claim 1, wherein the lower discharge shell is stationary and the upper receiver shell is movable by the displacement means.

3. The filter as defined in claim 1, wherein the blocking means comprises a plurality of pivotally mounted struts carried by the upper shell, a piston rod connected to each strut, and a cylinder for displacing the piston rod to selectively pivot the strut into a vertical orientation for blocking the upper shell in position for filtration.

4. The filter as defined in claim 3, characterized by said displacement means comprising a pneumatic cylinder having a piston interconnected with the upper shell.

5. The filter as defined in claim 1, characterized by each of said filter shells including a peripheral, compressible gasket.

6. The filter as defined in claim 1, wherein the blocking means comprises a horizontally displaceable member carried by the upper shell, the discplacement member being selectively, vertically aligned with the fixed abutting surfaceby a fluid power means when the upper shell is displaced by the displacement means to compress the gasket to said greater extent.

7. A pressure filter comprising a filter medium interposed between aligned shell members respectively defining an inlet chamber for receiving contaminated liquid under pressure and a discharge chamber receiving clarified liquid through the filter medium, said shells having opposed peripheral sealing surfaces, a compressible gasket interposed between said surfaces, and means for displacing one of the shells relative to the other shell, the improvement of mechanical means distinct from said displacing means for locking the displaceable shell in a filtration position adjacent the other shell after the displacment means has displaced the movable shell toward the other shell to compress the gasket to establish an essentially water-tight seal around periphery of the two shells, said mechanical locking means including a movable compression strut having terminal abutment surfaces and means for moving said strut to place one of said surfaces in engagement with the movable shell during the filtration cycle and to place the other of said surfaces in engagement with a blocking surface spaced from said movable shell, said strut being capable of resisting, in compression, those opening forces exerted on the movable shell by the internal filtration pressure within said filter chambers.

8. The filter as defined in claim 7, wherein the compression strut is pivotally mounted on the movable shell, the blocking surface is spaced from the movable shell in a direction away from the other shell, and the moving means (a) positions the strut in a locking position where the elongated axis of the strut is parallel to the direction of movement of the movable shell essentially for clamping the movable shell in a filtration position so that the gasket is maintained in a compressed, essentially water-tight condition, and (b) pivots the strut to a different position to accommodate the displacement of the movable shell away from the other shell.

9. The filter as defined in claim 7, wherein the compression strut comprises a linearly movable blocking member carried by the movable shell, and the moving means linearly moves the blocking member relative to the movable shell in a direction essentially perpendicular to the direction of movement of the movable shell (a) for selective alignment with the blocking surface to clamp the movable shell in filtration position and (b) for selective movement from alignment with the blocking surface to accommodate the displacement of the movable shell away from the other shell.

10. A filter, comprising relatively movable, vertically superimposed filter shells which define an upper receiver chamber and a lower discharge chamber, a filter medium interposed between the two shells, and the shells having opposed, aligned peripheral surfaces with at least one of said shells carrying a compressible gasket on its peripheral surface for sealing the filter assembly during filtration; means for vertically displacing the upper shell (a) to place the shells in adjacent proximity for a filtration cycle, (b) to compress the gasket prior to the initiation of a filtration cycle to an extent greater than that necessary for establishing a liquid-tight seal, and (c) to space the shells from each other subsequent to a filtration cycle; an abutment surface vertically spaced from the upper shell; and blocking means freely insertable between the upper shell and the abutment surface when the displacement means has compressed the gasket to said greater extent, the vertical dimension of said blocking means being slightly less than the corresponding dimension between said upper shell and the abutment surface when the gasket is compressed; the upper shell being slightly displaced away from the lower shell after the blocking means is inserted between the upper shell and the abutment, thereby (a) slightly relaxing the compression on the gasket, (b) placing the blocking means in compression to resist the forces generated within the filter shells during filtration and (c) maintaining the gasket in compression to maintain an essentially water-tight seal around the periphery of the filter shells.

11. In a method of sealing aligned, separable, liquid conducting shells of a pressure filter having a filter medium therebetween, and opposed aligned peripheral sealing surfaces on each of the shells, and a compressible gasket interposed between the sealing surfaces of said shells, the steps of:

displacing one of the shells from a first open position spaced from the other shell to a second closed position adjacent the other shell for filtration; during the displacement of said one movable shell, compressing the gasket to an extent greater than that necessary to establish an essentially water-tight seal between the sealing surfaces of said filter shell; loosely interposing a force bearing member between said movable shell and a fixed abutment surface ; flowing contaminated liquid under pressure into an influent chamber defined by one of said shells, flowing the liquid through the filter medium to accumulate contaminants, and receiving clarified liquid from the filter medium in an effluent chamber defined by the other of the shells; during initial filtration flow through the filter shell assembly, accommodating movement of the movable shell away from the other shell in response to the internal pressure of the contaminated liquid until the force bearing member is placed in compression, and thereafter utilizing the compression capability of said force bearing member to maintain the movable shell in a filtration position and to maintain the gasket in compression for an essentially water-tight seal between the separable shells; terminating liquid flow through the filter shells to relieve the internal pressure on the shells; slightly displacing the movable shell toward the other shell against the resistive force of the compressible gasket; displacing the force bearing member from its loosely interposed position; and displacing the movable shell to a second position spaced from the other shell to accommodate the discharge of accumulated contaminants.

12. The method as defined in claim 11, characterized by the steps of displacing the movable shell to the first and second positions being effected by a piston and cylinder functionally interconnected with the movable shell, and wherein pressure is applied to the movable shell throughout the filtration cycle by the piston and cylinder.

13. The method as defined in claim 11 wherein the force bearing member is a pivotally mounted strut carried by the movable shell, characterized by the step of positioning the force bearing member in its loosely interposed position being performed by pivoting the strut into a position essentially parallel to the direction of movement of the movable shell, so that the strut is in alignment with the movable shell and a fixed abutment surface spaced from the movable shell in a direction away from the other shell.

14. The method as defined in claim 11, characterized by said force bearing member being comprised of a slidable beam carried by the movable shell, wherein the step of positioning the force bearing member in its loosely interposed position is characterized by moving the beam in a direction essentially perpendicular to the direction of movement of the movable shell into alignment with the shell and a fixed abutment surface spaced from the movable shell in a direction away from the other shell.

15. In a method of locking two separable shells of a pressure filter in adjacent proximity for filtration, wherein one of the shells is fixed and the other is movable, wherein a compressible gasket is interposed between the aligned peripheries of the shells for sealing, and a filter medium is interposed between the shells for accumulating contaminants, the steps of:

(A) displacing the movable shell from a first position spaced from the fixed shell to a second position adjacent the fixed shell for filtration, thereby providing a space between an abutment surface on the movable shell and a fixed abutment surface spaced from the movable shell;

(B) during the performance of Step (A), compressing the gasket between the peripheries of the two shells to an extent greater than necessary to establish an essentially water-tight seal therebetween, thereby providing additional clearance between the two abutment surfaces;

(C) inserting a blocking member into the space between the abutment surfaces, with the additional clearance provided by the excessive compression of the gasket facilitating the performance of this step;

(D) flowing liquid under pressure into a receiver chamber defined by one of the shells, through the filter medium to accumulate contaminants, and into a discharge chamber defined by the other shells;

(E) during the performance of Step (D), placing the blocking member in compression between the movable shell and the fixed abutment surface to maintain the movable shell adjacent the fixed shell for the filtration cycle, the movable shell being slightly displaced away from the fixed shell to eliminate the clearance provided by the excessive compression, yet being maintained in a filtration position adjacent the fixed filter shell to maintain an essentially water-tight seal compression of the gasket; and (F) terminating the flow of liquid through the filter assembly.

16. The method as defined in claim 15, further including the steps of:

(G) slightly displacing the movable shell toward the fixed shell to re-establish a clearance between the blocking member and the two abutment surfaces;

(H) displacing the blocking member to accomodate the performance of Step (I); and (I) displacing the movable shell away from the fixed shell to accommodate the discharge of accumulated contaminants.

17. The method as defined in claim 15, further including the step of slightly displacing the movable shell away from the fixed shell subsequent to step (C) but prior to step (D).

18. In a method of pressure filtration by the accretion of solid contaminants on a foraminous filter medium located between separate filter shells, one of the shells being movable in a path toward and away from the other shell, said shells having a compressible gasket sealingly interposed therebetween during filtration, and the pressure of filtration tending to move the one shell in said path toward a fixed abutment interposed in said path, the steps of:
(1) moving said one shell in said path toward the other shell (a) to seal the shells to one another and (b) to compress said gasket to an extent such that the one shell is spaced from the abutment through a distance "d";
(2) interposing between the one shell and the abutment a stop member having a dimension "d−x" measured in the path of movement of said one shell;
(3) accomodating movement of the one shell away from the other shell through the distance "x" so that the stop member contacts both the abutment and the one shell to resist any further movement; and
(4) retaining the gasket under sufficient compression at the spacing between the shells after the movement of step (3) to maintain a seal.

19. In a method of pressure filtration by the accretion of solid contaminants on a foraminous filter medium clamped between the peripheries of separable filter shells, the clamping edges of said shells having a medium-engaging compressible gasket sealingly interposed therebetween, and the pressure of filtration tending to separate said shells, the steps of:
(1) separating the shells at the conclusion of a previous filtration cycle (a) to unclamp the filter medium and (b) to accomodate the removal of previously accreted contaminants, the separation of said shells moving one of the shells toward a fixed abutment spaced from the one shell,
(2) after removal of the contaminants, clamping the shells onto the filter medium under a load greater than that necessary to maintain liquid-tight seal during filtration, said greater load compressing the gasket to an extent greater than that necessary to maintain a seal during filtration under pressure,
(3) interposing a locking element between the one shell and said fixed abutment while the shells are clamped as defined in step (2),
(4) retaining the shells in clamped relation by the locking element interposed between the one shell and the fixed abutment, and
(5) reinitiating filtration under pressure, the locking element (a) resisting any separation of the shells under the pressure of filtration and (b) insuring the compression of the gasket to the extent necessary to maintain the seal during filtration.

20. In a method of locking two separable shells of a pressure filter in adjacent proximity for filtration, wherein one of the shells is fixed and the other is movable, wherein a compressible gasket is interposed between the aligned peripheries of the shells for sealing, and a filter medium is interposed between the shells for accumulating contaminants, the steps of:
(A) displacing the movable shell from an open position spaced from the fixed shell to a first closed position adjacent the fixed shell for filtration, and simultaneously spacing an abutment surface on the movable shell through a distance "d" from a fixed abutment surface spaced from the movable shell;
(B) during the performance of Step (A), compressing the gasket between the peripheries of the two shells to an extent greater than necessary to establish an essentially water-tight seal therebetween;
(C) loosely interposing a blocking member between the abutment surfaces, the blocking member having a dimension "d−x" interposed between the two abutment surfaces;
(D) flowing liquid under pressure into a receiver chamber defined by one of the shells, through the filter medium to accumulate contaminants, and into a discharge chamber defined by the other shells;
(E) during the performance of Step (D), moving the movable shell away from the fixed shell through the distance "x" to tightly interpose the blocking member between the two abutment surfaces and to place the blocking member in compression between the movable shell and the fixed abutment surface to maintain the movable shell adjacent the fixed shell for the filtration cycle, the compressible gasket being under sufficient residual compression to maintain an essentially water-tight seal between the shells.

21. In a pressure filter assembly having a filter medium between relatively movable, aligned filter shells which respectively define receiver and discharge chambers in the assembly; the shells having opposed, aligned peripheral surfaces, with at least one of said shells carrying a compressible gasket on its peripheral surface for sealing the filter assembly during filtration; an influent passageway for supplying contaminant-carrying liquid under pressure to the receiver chamber; and an effluent passageway interconnected with the discharge chamber for receiving clarified liquid after its passage through the filter medium, upon which contaminants are accreted; the improvement of: displacement means for relatively displacing the filter shells (a) to place the shells in adjacent proximity for a filtration cycle and (b) to compress the gasket prior to the initiation of a filtration cycle to an extent greater than that necessary to seal the filter assembly; a fixed abutment surface spaced from one of said filter shells through a distance "d" when the shells are displaced; and blocking means having a dimension "d−x" and freely insertable between said one shell and the abutment surface when the shells are displaced; the blocking means accommodating displacement of the one shell away from the other shell through the dimension "x" upon the introduction of liquid under pressure into the filter assembly for a filtration cycle, thereby (a) reducing the compression on the gasket by expansion of the gasket through the dimension "x" while still maintaining the gasket under sufficient compression to maintain an essentially liquid-tight seal between the shells, and (b) interposing the blocking means under compression between the two abutment surfaces to resist any further displacement of the one shell away from the other shell.

22. In a method of pressure filtration by the accretion of solid contaminants on a foraminous filter medium clamped between the peripheries of separable filter shells, the clamping edges of said shells having a medium-engaging compressible gasket sealingly interposed therebetween, and the pressure of filtration tending to separate said shells, the steps of:
(1) initially clamping the shells onto the filter medium under a load, (a) capable of compressing the gasket to an extent greater than that necessary to maintain a seal during filtration under pressure, and (b) less than that necessary to prevent separation of the shells during filtration under pressure;
(2) prior to initiation of filtration, loosely interposing a locking element between one of said shells and a fixed abutment while the shells are clamped under the load as defined in step (2), (3) initiating filtration under pressure, thereby separating said shells against the clamping load of step (1), and
(4) limiting the separation of the shells during the performance of Step (3) and during subsequent filtration under pressure while retaining the gasket compressed sufficiently to maintain a seal by the locking element which is snugly interposed under compression between said one of the shells and said fixed abutment.

* * * * *